(12) United States Patent
Munezawa

(10) Patent No.: US 10,081,220 B2
(45) Date of Patent: Sep. 25, 2018

(54) PNEUMATIC TIRE

(71) Applicant: SUMITOMO RUBBER INDUSTRIES, LTD., Kobe-shi, Hyogo (JP)

(72) Inventor: Goro Munezawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 125 days.

(21) Appl. No.: 15/210,009

(22) Filed: Jul. 14, 2016

(65) Prior Publication Data

US 2017/0036490 A1 Feb. 9, 2017

(30) Foreign Application Priority Data

Aug. 4, 2015 (JP) .................. 2015-154108

(51) Int. Cl.
| | |
|---|---|
| *B60C 15/06* | (2006.01) |
| *B60C 15/00* | (2006.01) |
| *B60C 3/04* | (2006.01) |

(52) U.S. Cl.
CPC .......... *B60C 15/0603* (2013.01); *B60C 3/04* (2013.01); *B60C 15/0027* (2013.01); *B60C 15/0607* (2013.01); *B60C 2015/061* (2013.01); *B60C 2015/0614* (2013.01)

(58) Field of Classification Search
CPC ............ B60C 15/0603; B60C 15/0607; B60C 2015/061; B60C 15/0614
See application file for complete search history.

(56) References Cited

U.S. PATENT DOCUMENTS

| | | | |
|---|---|---|---|
| 2002/0003017 A1* | 1/2002 | Baumann | ............. B60C 1/0025 152/517 |
| 2014/0000780 A1 | 1/2014 | Bruneau et al. | |
| 2016/0236521 A1* | 8/2016 | Yukawa | ............. B60C 17/0009 |

FOREIGN PATENT DOCUMENTS

| | | | |
|---|---|---|---|
| JP | 2012-025280 A | 2/2012 | |
| WO | WO-2015072322 A1 * | 5/2015 | ......... B60C 17/0009 |

* cited by examiner

*Primary Examiner* — Jodi C Franklin
(74) *Attorney, Agent, or Firm* — Birch, Stewart, Kolasch & Birch LLP

(57) ABSTRACT

In a tire 2, a contour of an outer surface of the second apex 38 includes: a circular arc C2 that extends inward from an outer end, in the radial direction, of the contour and is convex outward in the axial direction; and a circular arc C3 that is located inward of the circular arc C2 in the radial direction, is in contact with the circular arc C2, and is convex inward in the axial direction. A difference (Ht−Hw/2) between a height Ht from a bead base line to a contact point between the circular arc C2 and the circular arc C3 and a height that is half of a height Hw from the bead base line to a maximum width position is equal to or greater than −10 mm and equal to or less than 10 mm.

4 Claims, 3 Drawing Sheets

PNEUMATIC TIRE

This application claims priority on Patent Application No. 2015-154108 filed in JAPAN on Aug. 4, 2015. The entire contents of this Japanese Patent Application are hereby incorporated by reference.

BACKGROUND OF THE INVENTION

Field of the Invention

The present invention relates to pneumatic tires.

Description of the Related Art

A tire includes a pair of beads. Each bead includes a core and an apex. The apex extends from the core outward in a radial direction. The apex is formed from a highly hard crosslinked rubber.

In the tire, the bead portion is fitted to a rim. In a running state, a great load is applied to the bead portion. For achieving favorable durability of the tire, the stiffness of the bead portion is important. The stiffness of the bead portion influences handling stability and ride comfort. For improving the durability, handling stability, and ride comfort of the tire, the configuration of the bead portion is important.

Regarding the configuration of the bead portion, various examinations have been made. JP2012-025280 and JP2013-545671 (US2014/0000780) disclose examples of a tire in which an apex (also referred to as first apex) having a smaller length than a conventional apex is used in each bead. In each of these tires, another apex (also referred to as second apex) is further provided outward of each turned-up portion of a carcass in an axial direction.

Tires are desired to have further improved durability, handling stability, and ride comfort.

An object of the present invention is to provide a pneumatic tire that achieves favorable durability, handling stability, and ride comfort.

SUMMARY OF THE INVENTION

A pneumatic tire according to the present invention includes: a pair of beads; and a carcass extending on and between one of the beads and the other of the beads. Each bead includes a core, a first apex extending from the core outward in a radial direction, and a second apex located outward of the first apex in an axial direction. The carcass includes a carcass ply. The carcass ply is turned up around the core from an inner side toward an outer side in the axial direction, so that a main portion and a turned-up portion are formed in the carcass ply. The turned-up portion is located between the first apex and the second apex. The second apex is shaped to be tapered outward in the radial direction and be tapered inward in the radial direction. An outer edge, in the radial direction, of the second apex reaches a vicinity of a maximum width position of the tire. A thickness of the second apex becomes maximum in a vicinity of an end of the first apex. In a cross-section of the tire taken along a plane perpendicular to a circumferential direction, a contour of an inner surface, in the axial direction, of the second apex includes a circular arc C1 that is convex outward in the axial direction. The circular arc C1 extends inward from an outer end, in the radial direction, of the contour of the inner surface. A contour of an outer surface, in the axial direction, of the second apex includes: a circular arc C2 that is convex outward in the axial direction; and a circular arc C3 that is convex inward in the axial direction. The circular arc C2 extends inward from an outer end, in the radial direction, of the contour of the outer surface, and the circular arc C3 is located inward of the circular arc C2 in the radial direction and is in contact with the circular arc C2. When a height from a bead base line to the maximum width position of the tire is denoted by Hw, a difference (Ht−Hw/2) between a height Ht from the bead base line to a contact point between the circular arc C2 and the circular arc C3 and a height that is half of the height Hw is equal to or greater than −10 mm and equal to or less than 10 mm. A radius of curvature R1 of the circular arc C1 is greater than a radius of curvature R2 of the circular arc C2, and the radius of curvature R2 is greater than a radius of curvature R3 of the circular arc C3.

The inventors have made a close examination regarding the configuration of the bead. As a result, the inventors have found that not only the thickness and the height of the apex but also the shape of the contour of the apex influence durability. In particular, the inventors have found that favorable durability can be achieved by properly adjusting the shape of the contour of the second apex.

In the pneumatic tire according to the present invention, the radii of curvature of the circular arcs that form the contour of the second apex and the contact point between these circular arcs are properly adjusted. The second apex having this contour suppresses concentration of distortion when a load is applied. The second apex achieves high durability. The second apex having this contour can bend flexibly. The second apex contributes to improvement in handling stability and ride comfort. Furthermore, the thickness of the second apex becomes maximum in the vicinity of the end of the first apex. The second apex has a high lateral stiffness constant. This contributes to improvement in handling stability. The tire achieves favorable durability, ride comfort, and handling stability.

Preferably, a ratio (R2/R1) of the radius of curvature R2 relative to the radius of curvature R1 is equal to or greater than 0.6 and equal to or less than 0.9.

Preferably, a ratio (R3/R2) of the radius of curvature R3 relative to the radius of curvature R2 is equal to or greater than 0.5 and equal to or less than 0.8.

Preferably, the tire further includes: a pair of sidewalls; and a pair of clinches located inward of the respective sidewalls in the radial direction. When: a portion composed of the sidewall and the clinch of the tire is a side portion; a position that is located inward of the maximum width position Pt in the radial direction and on an outer surface of the side portion and at which a thickness of the side portion is maximum is denoted by Pr; a thickness of the second apex measured along a line that is normal to the outer surface of the second apex and drawn from the position Pr is denoted by F1; a maximum thickness of the second apex is denoted by F2; and a thickness of the second apex at a position on the outer surface of the second apex at which position a height in the radial direction from the bead base line is half (Hw/2) of the height Hw is denoted by F3, a ratio (F1/F2) of the thickness F1 relative to the thickness F2 is equal to or greater than 0.4 and equal to or less than 0.6. A ratio (F3/F2) of the thickness F3 relative to the thickness F2 is equal to or greater than 0.4 and equal to or less than 0.6.

Preferably, a difference (H2−Hw) between a height H2 from the bead base line to the outer edge, in the radial direction, of the second apex and the height Hw is equal to or greater than −10 mm and equal to or less than 10 mm.

DESCRIPTION OF THE PREFERRED EMBODIMENTS

The following will describe in detail the present invention based on preferred embodiments with appropriate reference to the drawings.

Figure 1:
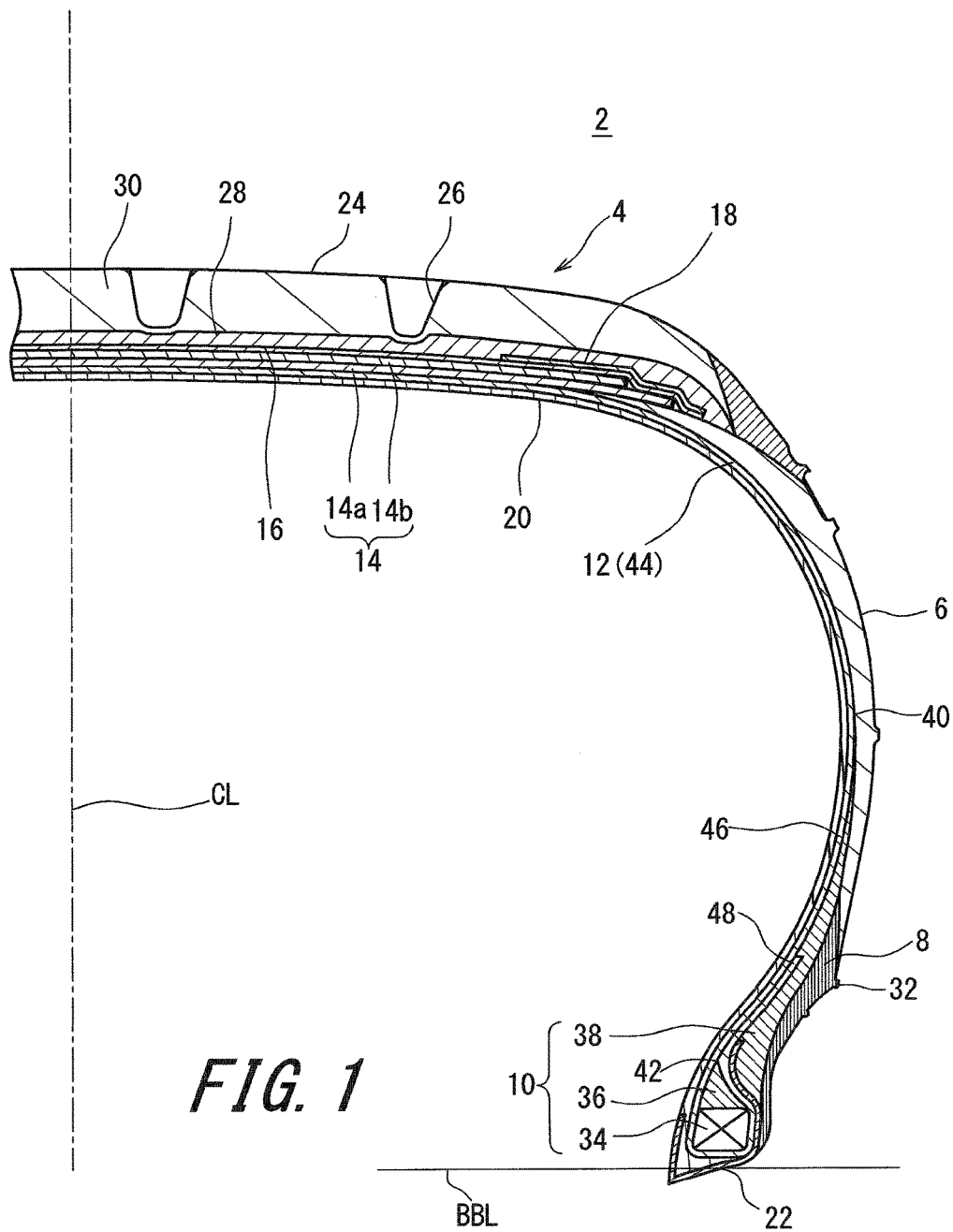
FIG. 1 is a cross-sectional view of a portion of a pneumatic tire according to an embodiment of the present invention.

FIG. 1 shows a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about the equator plane except for a tread pattern. In FIG. 1, a solid line BBL is a bead base line. The bead base line BBL is a line that defines the diameter (see JATMA) of a rim (not shown) on which the tire 2 is mounted. The bead base line BBL extends in the axial direction.

The tire 2 includes a tread 4, a pair of sidewalls 6, a pair of clinches 8, a pair of beads 10, a carcass 12, a belt 14, a band 16, a pair of edge bands 18, an inner liner 20, and a pair of chafers 22. The tire 2 is of a tubeless type. The tire 2 is mounted on a passenger car.

The tread 4 has a shape projecting outward in the radial direction. The tread 4 forms a tread surface 24 that is brought into contact with a road surface. Grooves 26 are formed on the tread 4. The tread pattern is formed by the grooves 26. The tread 4 includes a base layer 28 and a cap layer 30. The cap layer 30 is located outward of the base layer 28 in the radial direction. The cap layer 30 is laminated on the base layer 28. The base layer 28 is formed from a crosslinked rubber that is excellent in adhesiveness. A typical base rubber of the base layer 28 is a natural rubber. The cap layer 30 is formed from a crosslinked rubber that is excellent in wear resistance, heat resistance, and grip performance.

Each sidewall 6 extends from the edge of the tread 4 substantially inward in the radial direction. The inner edge, in the radial direction, of the sidewall 6 is joined to the clinch 8. The sidewall 6 is formed from a crosslinked rubber that is excellent in cut resistance and weather resistance. The sidewall 6 prevents the carcass 12 from being damaged.

Each clinch 8 is located substantially inward of the sidewall 6 in the radial direction. The clinch 8 extends from the edge of the sidewall 6 substantially inward in the radial direction. The clinch 8 is located outward of the bead 10 and the carcass 12 in the axial direction. The clinch 8 is formed from a crosslinked rubber that is excellent in wear resistance. The clinch 8 comes into contact with a flange of the rim.

In the present invention, a portion composed of the sidewall 6 and the clinch 8 is referred to as a side portion of the tire 2. In the present embodiment, the side portion includes a projection portion 32 having an outer surface that projects outward in the axial direction in a tapered shape. The side portion may not include the projection portion 32.

Each bead 10 is located inward of the clinch 8 in the axial direction. The bead 10 includes a core 34, a first apex 36, and a second apex 38. The core 34 has a ring shape and includes a non-stretchable wound wire. A typical material of the wire is steel. The first apex 36 extends from the core 34 outward in the radial direction. The first apex 36 is tapered outward in the radial direction. The second apex 38 is located outward of the first apex 36 in the axial direction. The second apex 38 is located between the clinch 8 and the carcass 12 in the axial direction. In the tire 2, an outer edge 40 of the second apex 38 is located outward of an end 42 of the first apex 36 in the radial direction.

The carcass 12 is formed of a carcass ply 44. The carcass ply 44 extends on and between one of the beads 10 and the other bead 10. The carcass ply 44 extends along the inner sides of the tread 4 and each sidewall 6. The carcass ply 44 is turned up around each core 34 from the inner side toward the outer side in the axial direction. Due to this turning-up, a main portion 46 and turned-up portions 48 are formed in the carcass ply 44. Each turned-up portion 48 is located between the first apex 36 and the second apex 38.

The carcass ply 44 includes a large number of cords aligned with each other, and a topping rubber. The absolute value of the angle of each cord relative to the equator plane is 75° to 90°. In other words, the carcass 12 has a radial structure. The cords are formed from an organic fiber. Examples of preferable organic fibers include polyester fibers, nylon fibers, rayon fibers, polyethylene naphthalate fibers, and aramid fibers. The carcass 12 may be formed of two or more carcass plies 44.

The belt 14 is located inward of the tread 4 in the radial direction. The belt 14 is laminated on the carcass 12. The belt 14 reinforces the carcass 12. The belt 14 includes an inner layer 14a and an outer layer 14b. Each of the inner layer 14a and the outer layer 14b includes a large number of cords aligned with each other, and a topping rubber, which are not shown. Each cord is tilted relative to the equator plane. The absolute value of the tilt angle is generally equal to or greater than 10° and equal to or less than 35°. The direction in which each cord of the inner layer 14a is tilted relative to the equator plane is opposite to the direction in which each cord of the outer layer 14b is tilted relative to the equator plane. The material of the cords is preferably steel. An organic fiber may be used for the cords. The belt 14 may include three or more layers.

The band 16 is located outward of the belt 14 in the radial direction. The width of the band 16 is larger than the width of the belt 14 in the axial direction. The band 16 includes a cord and a topping rubber, which are not shown. The cord is helically wound. The band 16 has a so-called jointless structure. The cord extends substantially in the circumferential direction. The angle of the cord relative to the circumferential direction is equal to or less than 5° and further equal to or less than 2°. The belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

Each edge band 18 is located outward of the band 16 in the radial direction and near the edge of the band 16. The edge band 18 includes a cord and a topping rubber, which are not shown. The cord is helically wound. The edge band 18 has a so-called jointless structure. The cord extends substantially in the circumferential direction. The angle of the cord relative to the circumferential direction is equal to or less than 5° and further equal to or less than 2°. The edge of the belt 14 is held by the cord, so that lifting of the belt 14 is suppressed. The cord is formed from an organic fiber. Examples of preferable organic fibers include nylon fibers, polyester fibers, rayon fibers, polyethylene naphthalate fibers, and aramid fibers.

The inner liner 20 is located inward of the carcass 12. The inner liner 20 is joined to the inner surface of the carcass 12. The inner liner 20 is formed from a rubber that is excellent in air blocking property. A typical base rubber of the inner liner 20 is an isobutylene-isoprene-rubber or halogenated isobutylene-isoprene-rubber. The inner liner 20 maintains the internal pressure of the tire 2.

Each chafer 22 is located near the bead 10. As is obvious from the drawing, the chafer 22 is turned up around the bead 10 from the inner side toward the outer side in the axial direction. One edge of the chafer 22 is located outward of the carcass 12 in the axial direction. The one edge of the chafer 22 is located between the turned-up portion 48 and the clinch 8 in the axial direction. The other edge of the chafer 22 is located inward of the carcass 12 in the axial direction. The other edge of the chafer 22 is located inward of the end 42 of the first apex 36 in the radial direction. When the tire 2 is mounted onto the rim, the chafer 22 comes into contact with the rim. Due to this contact, the vicinity of the bead 10 is protected. In the present embodiment, the chafer 22 includes a fabric and a rubber with which the fabric is impregnated.

Figure 2:
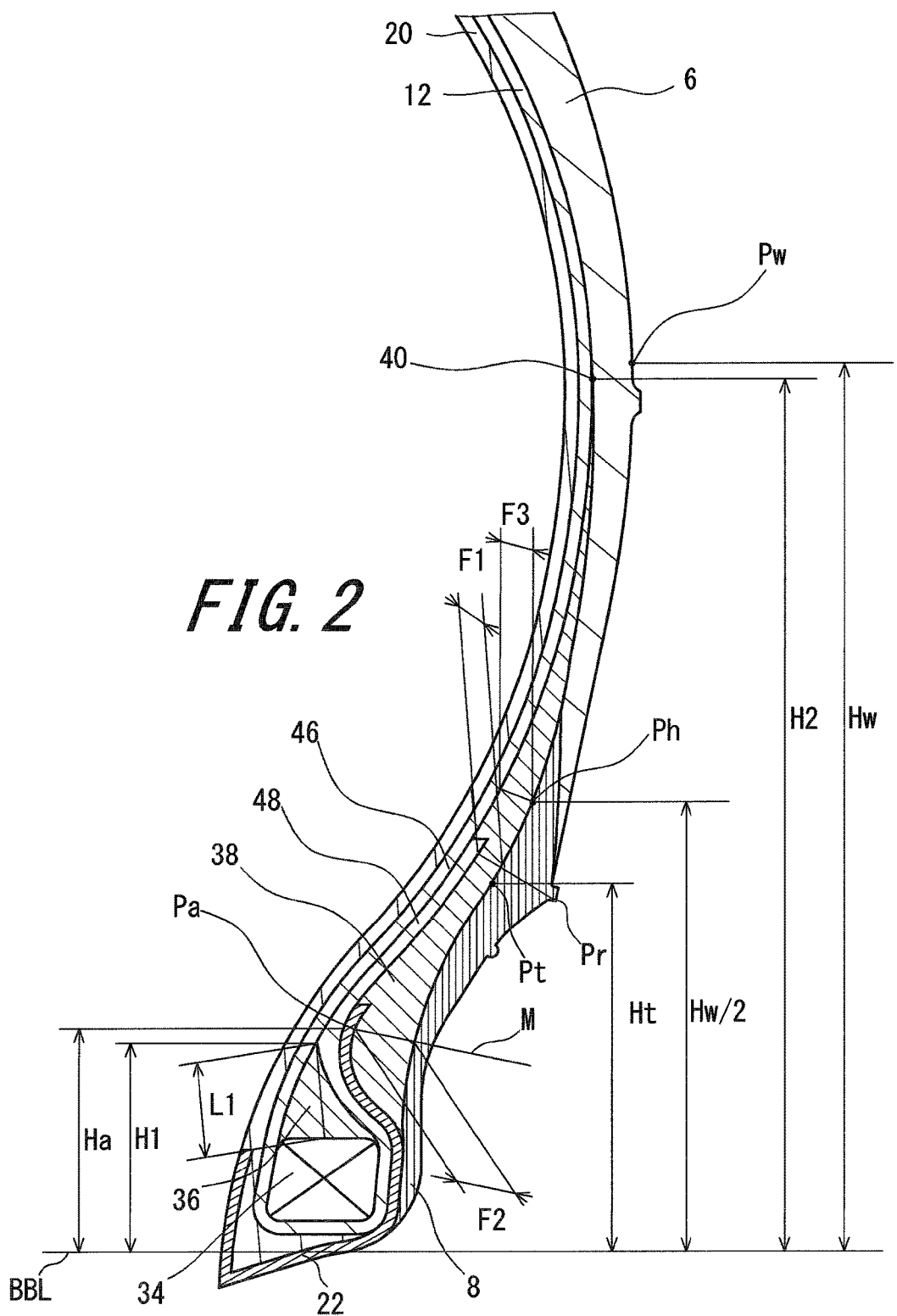
FIG. 2 is an enlarged cross-sectional view of a portion of the tire in FIG. 1.
Figure 3:
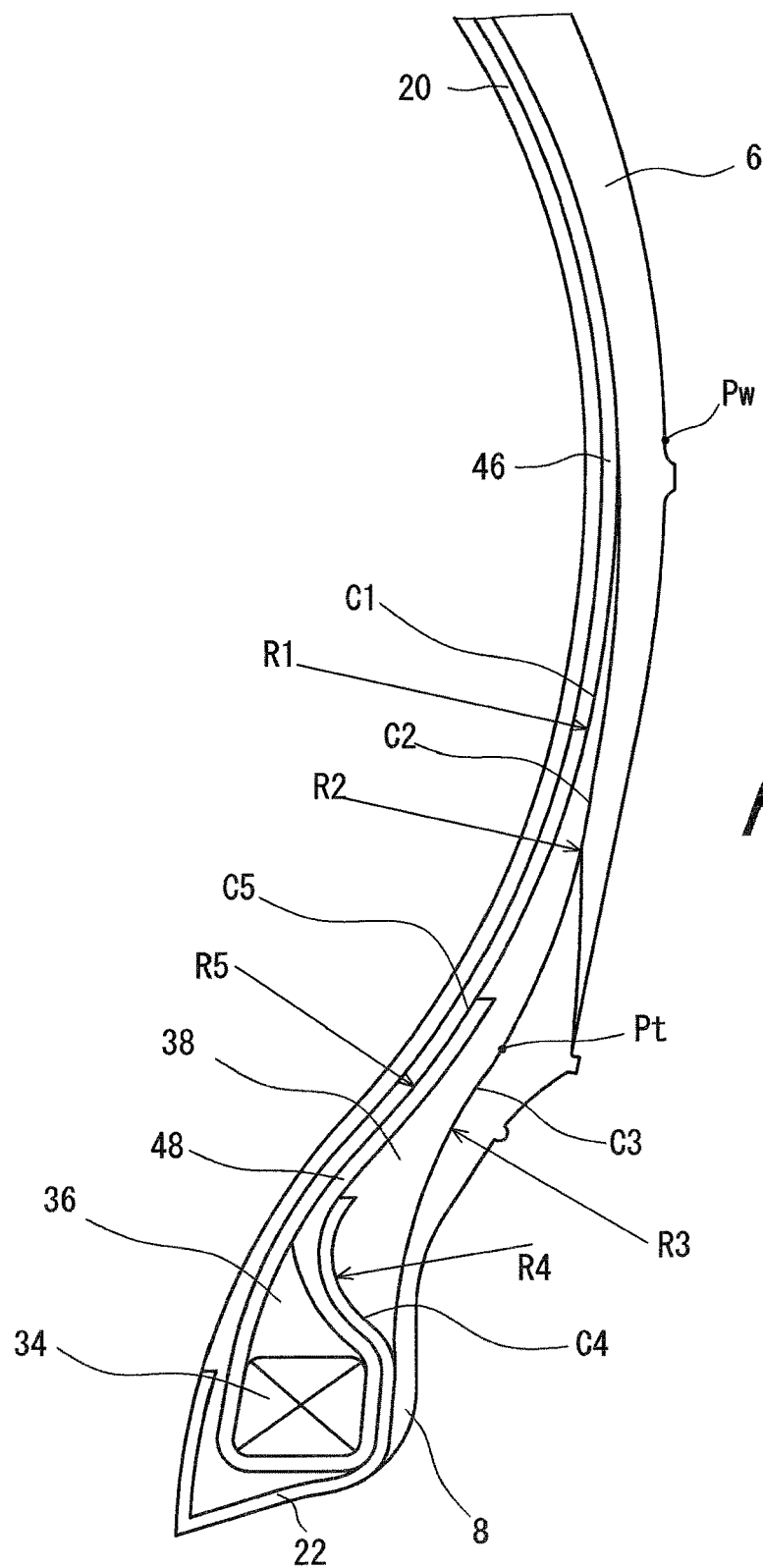
FIG. 3 is a diagram showing the contours of the tire shown in FIG. 2 and components thereof.

FIG. 2 shows a portion of the tire 2 shown in FIG. 1. FIG. 2 shows a bead 10 portion of the tire 2. FIG. 3 shows the contours of the tire and components thereof (bead, clinch, etc.) in the portion of the tire in FIG. 2. In FIGS. 2 and 3, the up-down direction is the radial direction of the tire 2, the right-left direction is the axial direction of the tire 2, and the direction perpendicular to the surface of the sheet is the circumferential direction of the tire 2.

In the present invention, the contour of the outer surface of the tire 2 is referred to as profile. In the case where grooves or projections are provided on the outer surface, the profile is represented by using a virtual outer surface obtained by postulating that the grooves or the projections do not exist.

In FIG. 2, reference character Pw indicates a position on the profile of the tire 2. The profile of the tire 2 has a maximum width in the axial direction at the position Pw. In other words, the position Pw is a maximum width position at which the width of the tire 2 is maximum.

As shown in the drawing, the second apex 38 is tapered outward in the radial direction. In the radial direction, the outer edge 40 of the second apex 38 reaches the vicinity of the maximum width position Pw. The second apex 38 is tapered inward in the radial direction. In the radial direction, the inner edge of the second apex 38 reaches the vicinity of the outer edge of the core 34.

In FIG. 2, a straight line M is a line that is normal to the outer surface, in the axial direction, of the second apex 38. The normal line M passes through a position Pa on the inner surface of the second apex 38. A double-headed arrow F2 indicates the maximum thickness of the second apex 38. Specifically, the double-headed arrow F2 indicates the maximum value of the distance between the outer surface and the inner surface which is measured along a line that is normal to the outer surface. At the position Pa, the second apex 38 has a maximum thickness F2. A double-headed arrow Ha indicates the height in the radial direction from the bead base line BBL to the position Pa. A double-headed arrow H1 indicates the height in the radial direction from the bead base line BBL to the end 42 of the first apex 36. As shown in the drawing, the position Pa is located in the vicinity of the end 42 of the first apex 36. That is, in the tire 2, the thickness of the second apex 38 becomes maximum in the vicinity of the end 42 of the first apex 36. Here, the position Pa being located in the vicinity of the end 42 of the first apex 36 means that the ratio (Ha/H1) of the height Ha relative to the height H1 is equal to or greater than 0.9 and equal to or less than 1.1.

As shown in FIG. 3, the contour of the inner surface, in the axial direction, of the second apex 38 includes: a circular arc C1 that is convex outward in the axial direction; and a circular arc C4 that is convex inward in the axial direction. The circular arc C1 extends inward from the outer end, in the radial direction, of the contour of the inner surface. The circular arc C4 extends outward from the vicinity of the inner end, in the radial direction, of the contour of the inner surface. The circular arc C4 is located in the vicinity of the first apex 36.

As shown in FIG. 3, the contour of the outer surface, in the axial direction, of the second apex 38 includes: a circular arc C2 that is convex outward in the axial direction; and a circular arc C3 that is convex inward in the axial direction. The circular arc C2 extends inward from the outer end, in the radial direction, of the contour of the outer surface. The circular arc C3 is located inward of the circular arc C2 in the radial direction. The circular arc C3 is in contact with the circular arc C2. In the drawing, a point Pt is a contact point between the circular arc C3 and the circular arc C2. The circular arc C2 and the circular arc C3 have a common tangent line at the point Pt.

In FIG. 2, a double-headed arrow Ht indicates the height in the radial direction from the bead base line BBL to the contact point Pt. A double-headed arrow Hw indicates the height in the radial direction from the bead base line BBL to the maximum width position Pw. In the tire 2, the height Ht is substantially half of the height Hw. Specifically, the difference (Ht−Hw/2) between the height Ht and ½ of the height Hw is equal to or greater than −10 mm and equal to or less than 10 mm.

In the tire 2, the radius of curvature R1 of the circular arc C1 is greater than the radius of curvature R2 of the circular arc C2. The radius of curvature R2 of the circular arc C2 is greater than the radius of curvature R3 of the circular arc C3. The radius of curvature R3 of the circular arc C3 is greater than the radius of curvature R4 of the circular arc C4.

Hereinafter, advantageous effects of the present invention will be described.

In the pneumatic tire 2 according to the present invention, the contour of the inner surface, in the axial direction, of the second apex 38 includes the circular arc C1, which extends inward from the outer end, in the radial direction, of the contour and is convex outward in the axial direction. The contour of the outer surface, in the axial direction, of the second apex 38 includes: the circular arc C2, which extends inward from the outer end, in the radial direction, of the contour and is convex outward in the axial direction; and the circular arc C3, which is located inward of the circular arc C2 in the radial direction, is in contact with the circular arc C2, and is convex inward in the axial direction. When the height from the bead base line BBL to the maximum width position of the tire 2 is denoted by Hw, the difference (Ht−Hw/2) between the height Ht from the bead base line BBL to the contact point between the circular arc C2 and the circular arc C3 and a height that is half of the height Hw is equal to or greater than −10 mm and equal to or less than 10 mm. The radius of curvature R1 of the circular arc C1 is greater than the radius of curvature R2 of the circular arc C2, and the radius of curvature R2 is greater than the radius of curvature R3 of the circular arc C3. The second apex 38 having this contour suppresses concentration of distortion when a load is applied. The second apex 38 achieves high durability. The second apex 38 having this contour can bend flexibly. The second apex 38 contributes to improvement in handling stability and ride comfort. Furthermore, the thickness of the second apex 38 becomes maximum in the vicinity of the end 42 of the first apex 36. The second apex 38 has a high lateral stiffness constant. This contributes to improvement in handling stability. The tire 2 achieves favorable durability, ride comfort, and handling stability.

The ratio (R2/R1) of the radius of curvature R2 relative to the radius of curvature R1 is preferably equal to or greater than 0.6 and preferably equal to or less than 0.9. Thus, the second apex 38 suppresses concentration of distortion when a load is applied. The second apex 38 achieves high durability. Furthermore, the stiffness of the second apex 38 is properly adjusted. The second apex 38 can bend flexibly. The second apex 38 contributes to improvement in handling stability and ride comfort. The tire 2 including the second apex 38 achieves favorable handling stability and ride comfort.

The ratio (R3/R2) of the radius of curvature R3 relative to the radius of curvature R2 is preferably equal to or greater than 0.5 and preferably equal to or less than 0.8. Thus, the second apex 38 suppresses concentration of distortion when a load is applied. The second apex 38 achieves high durability. Furthermore, the stiffness of the second apex 38 is properly adjusted. The second apex 38 can bend flexibly. The second apex 38 contributes to improvement in handling stability and ride comfort. The tire 2 including the second apex 38 achieves favorable handling stability and ride comfort.

As described above, in the tire 2, the second apex 38 has the maximum thickness F2 in the vicinity of the first apex 36. Making the thickness of the second apex 38 large in the vicinity of the end 42 of the first apex 36 effectively contributes to the lateral stiffness constant of the tire 2. The tire 2 is excellent in handling stability.

A preferable value of the maximum thickness F2 is different depending on the load index of the tire 2. The load index is a sign representing the maximum weight that can be applied to the tire 2 under the use conditions specified in JATMA standard. For the tire 2 having a load index of less than 93, the maximum thickness F2 is preferably equal to or greater than 1.5 mm and preferably equal to or less than 2.5 mm. By making the maximum thickness F2 equal to or greater than 1.5 mm, the second apex 38 has sufficient stiffness that allows the second apex 38 to bear a certain load. The tire 2 is excellent in durability. Furthermore, the second apex 38 effectively contributes to the lateral stiffness constant. The tire 2 achieves favorable handling stability. By making the maximum thickness F2 equal to or less than 2.5 mm, influence of the second apex 38 on the tire weight is suppressed. Influence of the second apex 38 on rolling resistance is suppressed. Similarly, for the tire 2 having a load index of equal to or greater than 93 and less than 100, the maximum thickness F2 is preferably equal to or greater than 3.5 mm and preferably equal to or less than 4.5 mm. For the tire 2 having a load index of equal to or greater than 100, the maximum thickness F2 is preferably equal to or greater than 5.5 mm and preferably equal to or less than 6.5 mm.

In FIG. 2, reference character Pr indicates a position on the outer surface of the side portion. The position Pr is a position that is located inward of the maximum width position Pw in the radial direction and at which the thickness of the side portion is maximum. Here, the thickness of the side portion is the distance between the inner surface and the outer surface of the side portion which is measured along a line that is normal to the inner surface of the side portion. In the present embodiment, the position Pr is located on the outer surface of the clinch 8. The position Pr may be located on the outer surface of the sidewall 6.

A double-headed arrow F1 indicates the thickness of the second apex 38 at the position Pr. Specifically, the thickness F1 is the distance between the outer surface and the inner surface of the second apex 38 which is measured along a line that is normal to the outer surface of the second apex 38 and drawn from the position Pr.

In the tire 2, the ratio (F1/F2) of the thickness F1 relative to the maximum thickness F2 of the second apex 38 is preferably equal to or greater than 0.4. By making the ratio (F1/F2) equal to or greater than 0.4, the second apex 38 effectively contributes to the lateral stiffness constant. The tire 2 is excellent in handling stability. Furthermore, the second apex 38 has sufficient that allows the second apex 38 to bear a certain load. The tire 2 is excellent in durability. The ratio (F1/F2) is preferably equal to or less than 0.6. By making the ratio (F1/F2) equal to or less than 0.6, the influence of the second apex 38 on the tire weight is suppressed. The influence of the second apex 38 on rolling resistance is suppressed.

In FIG. 2, reference character Ph indicates a position on the outer surface of the second apex 38. The height in the radial direction from the bead base line BBL to the position Ph is half (Hw/2) of the height Hw. A double-headed arrow F3 indicates the thickness of the second apex 38 at the position Ph. Specifically, the thickness F3 is the distance between the outer surface and the inner surface of the second apex 38 which is measured along a normal line at the position Ph.

In the tire 2, the ratio (F3/F2) of the thickness F3 relative to the maximum thickness F2 of the second apex 38 is preferably equal to or greater than 0.4. By making the ratio (F3/F2) equal to or greater than 0.4, the second apex 38 effectively contributes to the lateral stiffness constant. The tire 2 is excellent in handling stability. Furthermore, the second apex 38 has sufficient stiffness that allows the second apex 38 to bear a certain load. The tire 2 is excellent in durability. The ratio (F3/F2) is preferably equal to or less than 0.6. By making the ratio (F3/F2) equal to or less than 0.6, the influence of the second apex 38 on the tire weight is suppressed. The influence of the second apex 38 on rolling resistance is suppressed.

The thickness F1 and the thickness F2 are preferably substantially equal to each other. Specifically, the ratio (F1/F2) of F1 relative to F2 is preferably equal to or greater than 0.9 and equal to or less than 1.1.

In FIG. 2, a double-headed arrow H2 indicates the height from the bead base line BBL to the outer edge, in the radial direction, of the second apex 38. The difference (H2−Hw) between the height H2 and the height Hw is preferably equal to or greater than −10 mm. By making the difference (H2−Hw) equal to or greater than −10 mm, the second apex 38 effectively contributes to the in-plane torsional stiffness of the bead 10 portion. The tire 2 is excellent in durability. In this respect, the difference (H2−Hw) is more preferably equal to or greater than −8 mm. The difference (H2−Hw) is preferably equal to or less than 10 mm. By making the difference (H2−Hw) equal to or less than 10 mm, influence of the second apex 38 on vertical stiffness constant is suppressed. With the tire 2, favorable ride comfort is maintained. Furthermore, the influence of the second apex 38 on the tire weight is suppressed. The influence of the second apex 38 on rolling resistance is suppressed. In these respects, the difference (H2−Hw) is more preferably equal to or less than 8 mm.

The height H2 is preferably equal to or greater than 50 mm. By making the height H2 equal to or greater than 50 mm, the second apex 38 contributes to the in-plane torsional stiffness of the bead 10 portion. The tire 2 is excellent in durability. The height H2 is preferably equal to or less than 75 mm. By making the height H2 equal to or less than 75 mm, the influence of the second apex 38 on vertical stiffness constant is suppressed. With the tire 2, favorable ride comfort is maintained. Furthermore, the influence of the second apex 38 on the tire weight is suppressed. The influence of the second apex 38 on rolling resistance is suppressed.

As shown in FIG. 3, at an outer portion, in the radial direction, of the second apex 38, the second apex 38 is in contact with the main portion 46 of the carcass ply 44. As described above, at this portion, the inner surface, in the axial direction, of the second apex 38 includes the circular arc C1. That is, the contour of the outer surface of the main portion 46 includes a circular arc C5 that has a radius of curvature equal to that of the circular arc C1 and overlaps the circular arc C1 at this portion. The circular arc C5, which forms the contour of the outer surface of the main portion 46, extends inward from the vicinity of the maximum width position Pw.

The circular arc C5, which forms the contour of the outer surface of the main portion 46, preferably extends to the vicinity of the end 42 of the first apex 36. In other words, the contour of the outer surface of the main portion 46 from the vicinity of the maximum width position Pw to the vicinity of the end 42 of the first apex 36 is preferably composed of the single circular arc C5. This contour suppresses formation of a portion having specific stiffness in a sidewall 6 portion of the tire 2. In the tire 2, the entirety of the sidewall 6 portion bends properly. In the tire 2, the sidewall 6 portion effectively contributes to stiffness as a whole. Such bending contributes to the handling stability of the tire 2.

In the tire 2, each second apex 38 is located between the turned-up portion 48 of the carcass ply 44 and the clinch 8. In the tire 2, each turned-up portion 48 is arranged inward of the turned-up portion of a conventional tire in the axial direction. This arrangement can suppress concentration of distortion on the turned-up portion 48. Since occurrence of loose is suppressed, the tire 2 is excellent in durability.

The complex elastic modulus E1 of the first apex 36 is preferably equal to or greater than 60 MPa. By setting the elastic modulus E1 to 60 MPa or greater, the first apex 36 contributes to supporting the tire 2. The tire 2 is excellent in handling stability. The complex elastic modulus E1 of the first apex 36 is preferably equal to or less than 70 MPa. By setting the elastic modulus E1 to 70 MPa or less, influence of the first apex 36 on stiffness is suppressed. With the tire 2, ride comfort is appropriately maintained.

The complex elastic modulus E2 of the second apex 38 is preferably equal to or greater than 60 MPa. By setting the elastic modulus E2 to 60 MPa or greater, the second apex 38 contributes to the in-plane torsional stiffness. The tire 2 is excellent in handling stability. The complex elastic modulus E2 of the second apex 38 is preferably equal to or less than 70 MPa. By setting the elastic modulus E2 to 70 MPa or less, influence of the second apex 38 on stiffness is suppressed. With the tire 2, ride comfort is appropriately maintained.

In the present invention, the complex elastic modulus E1 of the first apex 36 and the complex elastic modulus E2 of the second apex 38 are measured according to the standards of "JIS K 6394" under the following conditions.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

In FIG. 2, a double-headed arrow L1 indicates the length of the first apex 36. The length L1 is represented by the length from the center, in the axial direction, of the bottom surface of the first apex 36 to the end 42 of the first apex 36.

The length L1 is preferably equal to or greater than 5 mm. By setting the length L1 to 5 mm or greater, the first apex 36 can effectively contribute to the lateral stiffness constant. The tire 2 is excellent in handling stability. The length L1 is preferably equal to or less than 15 mm. By setting the length L1 to 15 mm or less, the carcass 12 having a proper contour is obtained. The carcass 12 contributes to the durability and the handling stability of the tire 2.

In the present invention, the dimensions and angles of each component of the tire 2 are measured in a state where the tire 2 is mounted on a normal rim and inflated to a normal internal pressure. During the measurement, no load is applied to the tire 2. In the present specification, the normal rim means a rim specified in a standard on which the tire 2 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 2 is designed for a passenger car, the dimensions and angles are measured in a state where the internal pressure is 180 kPa.

EXAMPLES

Example 1

A pneumatic tire of Example 1 having the configuration shown in FIG. 1 and having specifications shown in Table 1 below was obtained. The size of the tire was set to "215/60R16 95H". The first apex and the second apex were formed by crosslinking the same rubber composition. The maximum width height Hw of the tire is 64.5 mm. The thickness F2 was set to 4 mm, the ratio (F1/F2) was set to 0.5, and the ratio (F3/F2) was set to 0.5. In the tire, the contour of the main portion of the carcass ply from the maximum width position to the position of the end of the first apex is composed of a circular arc having a radius of curvature equal to that of the circular arc C1.

Comparative Example 1

A tire of Comparative Example 1 was obtained in the same manner as in Example 1, except a second apex is not provided in this tire, the length L1 of the first apex of this tire was as shown in Table 1 below, and the carcass of this tire is composed of two carcass plies. The tire of Comparative Example 1 is a conventional tire.

Comparative Examples 2 and 3

Tires of Comparative Examples 2 and 3 were obtained in the same manner as in Example 1, except the radii of curvature R1, R2, and R3 were as shown in Table 1.

Examples 2 and 3 and Comparative Examples 4 to 6

Tires of Examples 2 and 3 and Comparative Examples 4 to 6 were obtained in the same manner as in Example 1, except the radii of curvature R1, R2, and R3 and the difference (Ht−Hw/2) were as shown in Table 2.

Examples 4 to 7

Tires of Examples 4 to 7 were obtained in the same manner as in Example 1, except the height H2 of the second apex was changed and the difference (H2−Hw) was as shown in Table 3.

[Handling Stability and Ride Comfort]

Each tire was mounted onto a rim of 8.0 JJ and inflated with air to an internal pressure of 230 kPa. The tire was mounted to a passenger car. A driver was caused to drive the passenger car on a test course and to evaluate handling stability and ride comfort. In the evaluation regarding handling stability, stability near N (neutral) and at lane change was checked. The results are shown as indexes in Tables 1 to 3 below. A higher value indicates a better result.

[Durability]

Each tire was mounted onto a normal rim and inflated with air to an internal pressure of 230 kPa. The tire was mounted to a drum type tire testing machine, and a vertical load of 8.15 kN was applied to the tire. Running with the tire was performed on a drum having a radius of 1.7 m at a speed of 100 km/h. A running distance until damage of the tire was recognized was measured. The results are shown in Tables 1 to 3 below as indexes based on Comparative Example 1. A higher value indicates a better result.

[Rolling Resistance]

A rolling resistance was measured using a rolling resistance tester under the following conditions.

Used rim: 8.0 JJ

Internal pressure: 230 kPa

Load: 8.15 kN

Speed: 80 km/h

The results are shown in Tables 1 to 3 below as indexes based on Comparative Example 1. A lower value indicates a better result.

TABLE 1

Results of Evaluation

| | | Comparative Example 1 | Example 1 | Comparative Example 2 | Comparative Example 3 |
|---|---|---|---|---|---|
| Radius R1 [mm] | | — | 90 | 70 | 90 |
| Radius R2 [mm] | | — | 70 | 90 | 50 |
| Radius R3 [mm] | | — | 50 | 50 | 70 |
| Difference (Ht − Hw/2) [mm] | | — | 0.0 | 0.0 | 18 |
| Difference (H2 − Hw) [mm] | | — | 0 | 0 | 0 |
| Length L1 [mm] | | 35 | 10 | 10 | 10 |
| Rolling resistance | | 100 | 97 | 99 | 102 |
| Handling stability | Near N | 6.0 | 7.0 | 6.5 | 5.0 |
| | Lane change | 6.0 | 7.0 | 6.0 | 5.0 |
| Ride comfort | | 6.0 | 7.0 | 5.5 | 5.0 |
| Durability | | 100 | 140 | 110 | 90 |

TABLE 2

Results of Evaluation

| | | Comparative Example 4 | Example 2 | Example 3 | Comparative Example 5 | Comparative Example 6 |
|---|---|---|---|---|---|---|
| Radius R1 [mm] | | 90 | 90 | 90 | 90 | 90 |
| Radius R2 [mm] | | 70 | 70 | 70 | 70 | 70 |
| Radius R3 [mm] | | 50 | 50 | 40 | 30 | 0 |
| Difference (Ht − Hw/2) [mm] | | 18 | 10 | −8 | −12 | −12 |
| Difference (H2 − Hw) [mm] | | 0 | 0 | 0 | 0 | 0 |
| Length L1 [mm] | | 10 | 10 | 10 | 10 | 10 |
| Rolling resistance | | 97 | 97 | 97 | 100 | 98 |
| Handling stability | Near N | 6.0 | 7.0 | 7.0 | 6.5 | 6.5 |
| | Lane change | 6.0 | 7.0 | 6.5 | 6.5 | 6.5 |
| Ride comfort | | 6.0 | 6.5 | 6.5 | 5.5 | 6.0 |
| Durability | | 120 | 135 | 130 | 110 | 120 |

TABLE 3

Results of Evaluation

| | | Example 4 | Example 5 | Example 6 | Example 7 |
|---|---|---|---|---|---|
| Radius R1 [mm] | | 90 | 90 | 90 | 90 |
| Radius R2 [mm] | | 70 | 70 | 70 | 70 |
| Radius R3 [mm] | | 50 | 50 | 50 | 50 |
| Difference (Ht − Hw/2) [mm] | | 0.0 | 0.0 | 0.0 | 0.0 |
| Difference (H2 − Hw) [mm] | | −15 | −10 | 10 | 15 |
| Length L1 [mm] | | 10 | 10 | 10 | 10 |
| Rolling resistance | | 97 | 97 | 98 | 100 |
| Handling stability | Near N | 6.5 | 7.0 | 7.0 | 7.0 |
| | Lane change | 6.5 | 6.5 | 7.0 | 7.0 |
| Ride comfort | | 7.0 | 7.0 | 7.0 | 6.5 |
| Durability | | 130 | 135 | 140 | 140 |

As shown in Tables 1 to 3, the evaluation is higher in the tires of the examples than in the tires of the comparative examples. From the results of evaluation, advantages of the present invention are clear.

The pneumatic tire described above is also applicable to various vehicles.

The above descriptions are merely illustrative examples, and various modifications can be made without departing from the principles of the present invention.

What is claimed is:

1. A pneumatic tire comprising:
a pair of beads; and
a carcass extending on and between one of the beads and the other of the beads, wherein
each bead includes a core, a first apex extending from the core outward in a radial direction, and a second apex located outward of the first apex in an axial direction,
the carcass includes a carcass ply,
the carcass ply is turned up around the core from an inner side toward an outer side in the axial direction, so that a main portion and a turned-up portion are formed in the carcass ply,
the turned-up portion is located between the first apex and the second apex,
the second apex is shaped to be tapered outward in the radial direction and be tapered inward in the radial direction,
when a height from a bead base line to the maximum width position of the tire is denoted by Hw,
a difference (H2−Hw) between a height H2 from the bead base line to the outer edge, in the radial direction, of the second apex and the height Hw is equal to or greater than −15 mm and equal to or less than 15 mm,
when a position on the inner surface of the second apex where the second apex has a maximum thickness is denoted by Pa, a height in the radial direction from the bead base line BBL to the position Pa is denoted by Ha, and a height in the radial direction from the bead based line BBL to the end of the first apex is denoted by H1,
a ratio (Ha/H1) of height Ha relative to the height H1 is equal to or greater than 0.9 and equal to or less than 1.1,
in a cross-section of the tire taken along a plane perpendicular to a circumferential direction, a contour of an inner surface, in the axial direction, of the second apex includes a circular arc C1 that is convex outward in the axial direction,
the circular arc C1 extends inward from an outer end, in the radial direction, of the contour of the inner surface,
a contour of an outer surface, in the axial direction, of the second apex includes: a circular arc C2 that is convex outward in the axial direction; and a circular arc C3 that is convex inward in the axial direction,
the circular arc C2 extends inward from an outer end, in the radial direction, of the contour of the outer surface,
the circular arc C3 is located inward of the circular arc C2 in the radial direction and is in contact with the circular arc C2,
a difference (Ht−Hw/2) between a height Ht from the bead base line to a contact point between the circular arc C2 and the circular arc C3 and a height that is half of the height Hw is equal to or greater than −10 mm and equal to or less than 10 mm,
a ratio (R2/R1) of a radius of curvature R2 of the circular arc C2 relative to a radius of curvature R1 of the circular arc C1 is equal to greater than 0.6 and equal to or less than 0.9, and
the radius of curvature R2 is greater than a radius of curvature R3 of the circular arc C3.

2. The pneumatic tire according to claim 1, wherein a ratio (R3/R2) of the radius of curvature R3 relative to the radius of curvature R2 is equal to or greater than 0.5 and equal to or less than 0.8.

3. The pneumatic tire according to claim 1, further comprising:
a pair of sidewalls; and
a pair of clinches located inward of the respective sidewalls in the radial direction, wherein
when: a portion composed of the sidewall and the clinch of the tire is a side portion;
a position that is located inward of the maximum width position Pt in the radial direction and on an outer surface of the side portion and at which a thickness of the side portion is maximum is denoted by Pr;
a thickness of the second apex measured along a line that is normal to the outer surface of the second apex and drawn from the position Pr is denoted by F1;
a maximum thickness of the second apex is denoted by F2; and
a thickness of the second apex at a position on the outer surface of the second apex at which position a height in the radial direction from the bead base line is half (Hw/2) of the height Hw is denoted by F3,
a ratio (F1/F2) of the thickness F1 relative to the thickness F2 is equal to or greater than 0.4 and equal to or less than 0.6, and
a ratio (F3/F2) of the thickness F3 relative to the thickness F2 is equal to or greater than 0.4 and equal to or less than 0.6.

4. The pneumatic tire according to claim 1, wherein a difference (H2−Hw) between a height H2 from the bead base line to the outer edge, in the radial direction, of the second apex and the height Hw is equal to or greater than −10 mm and equal to or less than 10 mm.

* * * * *